(No Model.) 5 Sheets—Sheet 1.
O. W. ALLISON.
CIGARETTE MACHINE.
No. 459,119. Patented Sept. 8, 1891.
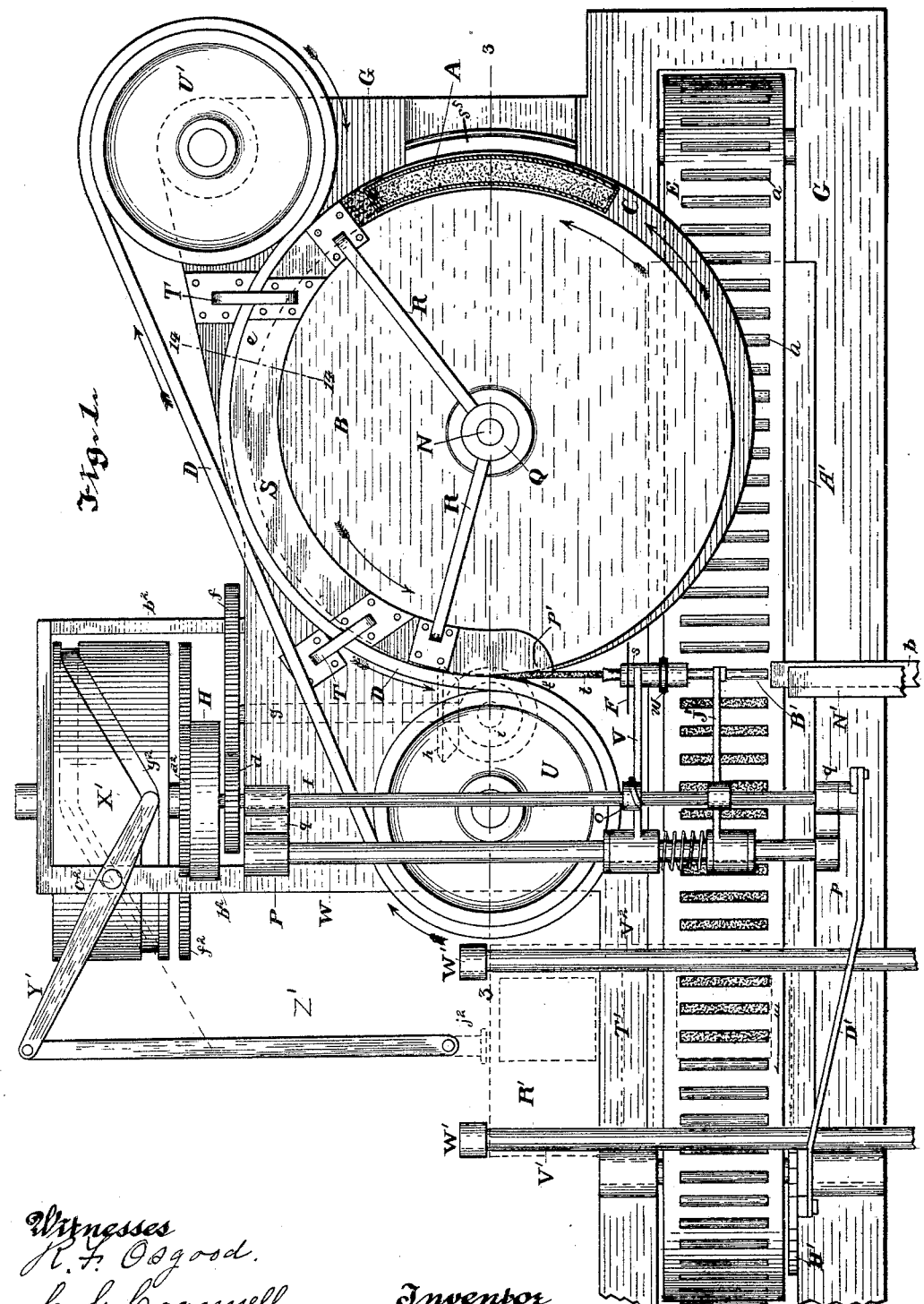
Witnesses
R. F. Osgood.
C. G. Cramwell.
Inventor
Oscar W. Allison,
By Geo. B. Selden, Atty.

(No Model.) 5 Sheets—Sheet 2.
O. W. ALLISON.
CIGARETTE MACHINE.
No. 459,119. Patented Sept. 8, 1891.
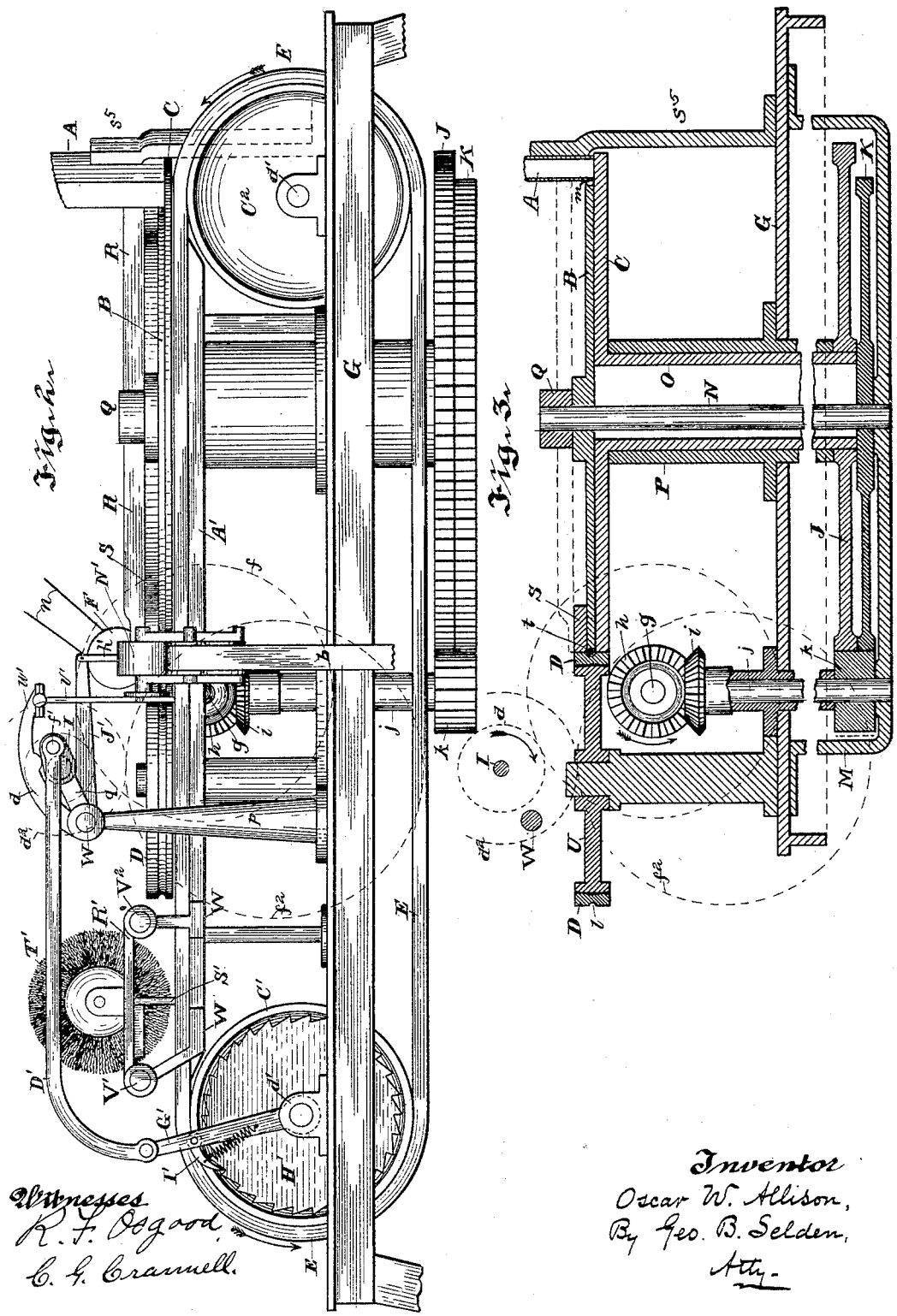
Witnesses
R. F. Osgood,
C. G. Crannell.
Inventor
Oscar W. Allison,
By Geo. B. Selden,
Atty.

(No Model.)  5 Sheets—Sheet 3.
O. W. ALLISON.
CIGARETTE MACHINE.
No. 459,119.  Patented Sept. 8, 1891.
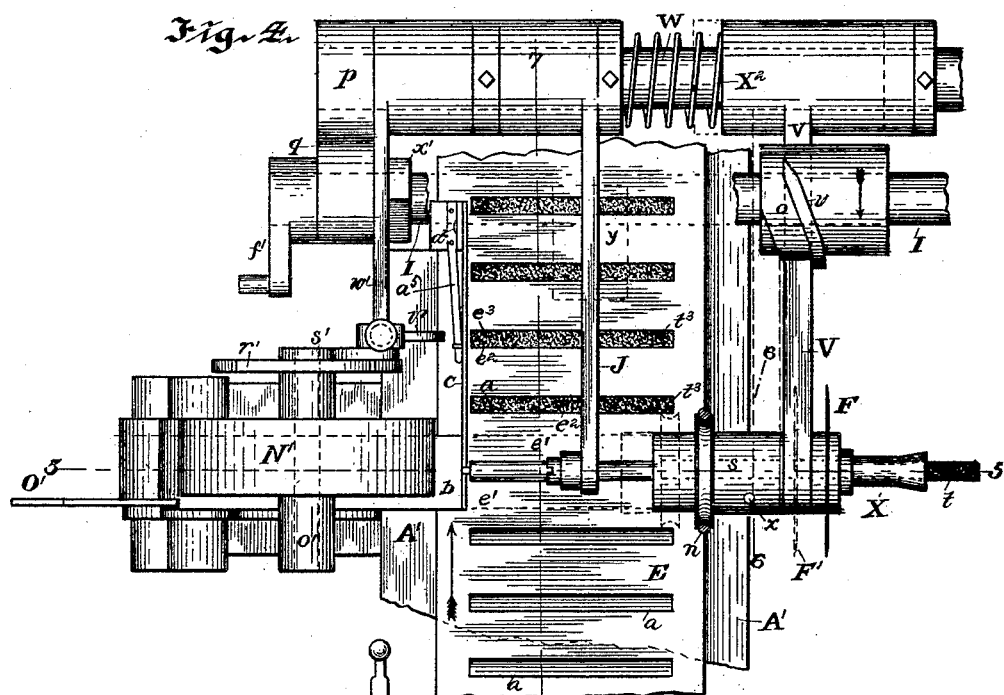
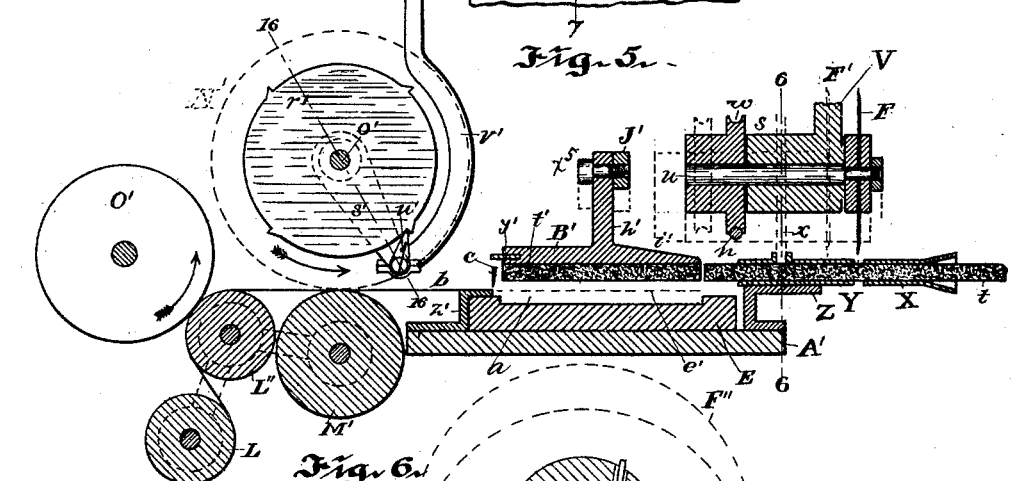
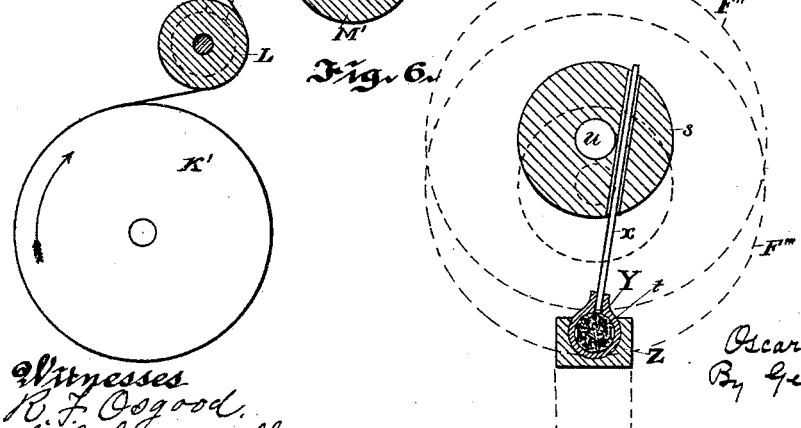
Witnesses
R. F. Osgood.
C. G. Crannell.
Inventor
Oscar W. Allison,
By Geo. B. Selden,
Atty.

(No Model.) 5 Sheets—Sheet 4.
O. W. ALLISON.
CIGARETTE MACHINE.
No. 459,119. Patented Sept. 8, 1891.
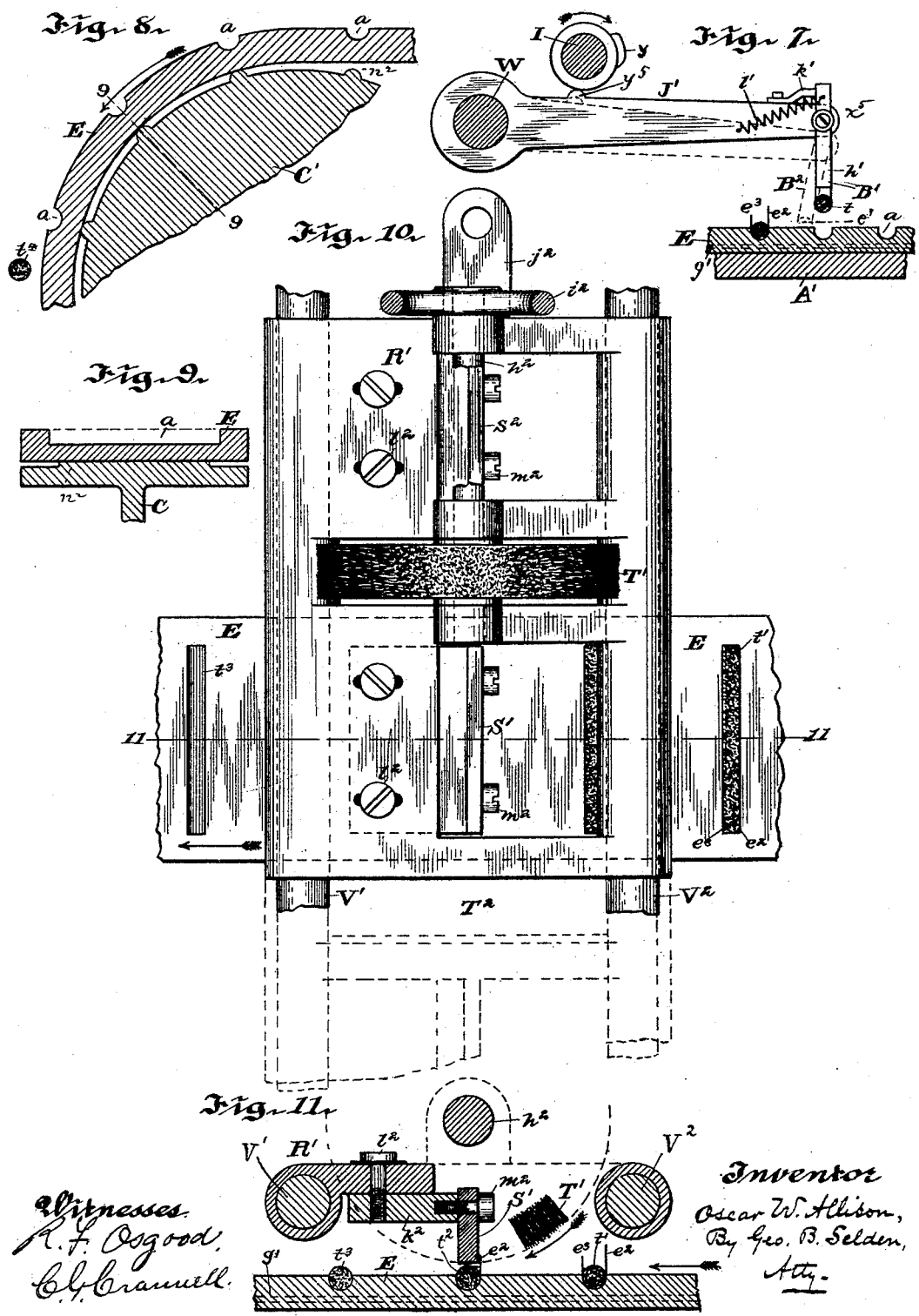

(No Model.) 5 Sheets—Sheet 5.
O. W. ALLISON.
CIGARETTE MACHINE.
No. 459,119. Patented Sept. 8, 1891.
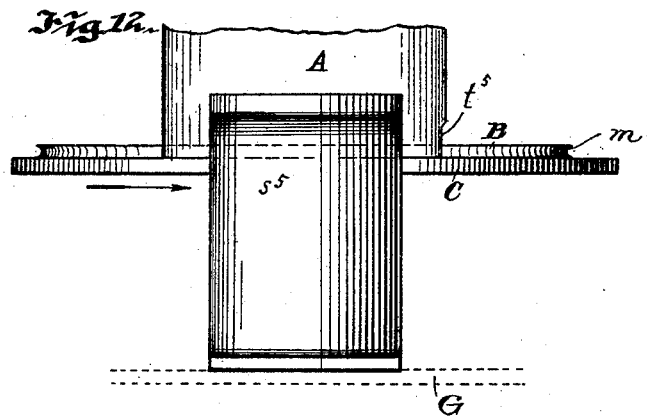
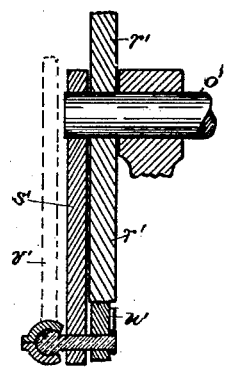
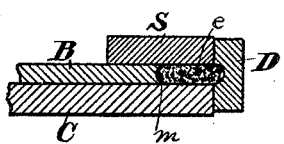
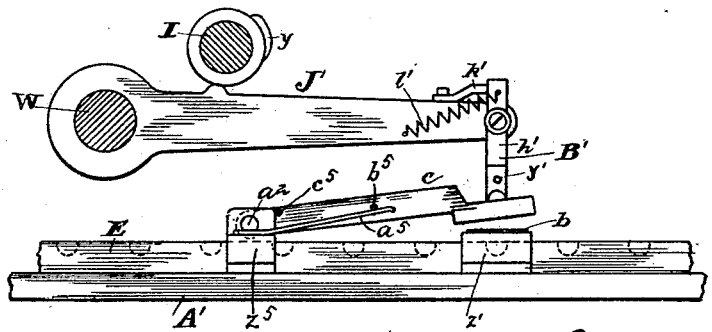
Witnesses
R. F. Osgood.
C. G. Crannell
Inventor
Oscar W. Allison,
By Geo. B. Selden,
Atty.

UNITED STATES PATENT OFFICE.

OSCAR W. ALLISON, OF ROCHESTER, NEW YORK.

CIGARETTE-MACHINE.

SPECIFICATION forming part of Letters Patent No. 459,119, dated September 8, 1891.

Application filed October 18, 1889. Renewed July 17, 1891. Serial No. 399,805. (No model.)

*To all whom it may concern:*

Be it known that I, OSCAR W. ALLISON, a citizen of the United States, residing at Rochester, in the county of Monroe, in the State of New York, have invented an Improved Cigarette-Machine, of which the following is a specification, reference being had to the accompanying drawings.

My present invention relates to an improved cigarette-machine of that class or type which are known in the art as "side machines," in which the cigarettes are made one by one by having the paper wrapped and sealed about the tobacco filler.

My present invention contemplates a cigarette-making machine comprising mechanism for forming and compressing a continuous tobacco rod or filler, devices for cutting the same into suitable lengths, apparatus for gumming and feeding a suitable paper wrapper and for severing the same into sections of the proper length, and an endless traveling flexible recessed band, in the recesses of which the wrapper is folded about the filler and its edges secured.

My improvements are fully represented and illustrated in the following specification and the accompanying drawings, and the novel features thereof specified in the claims annexed to the said specification.

My improved cigarette-machine is represented in the accompanying drawings, in which—

Figure 1 is a plan view. Fig. 2 is a front elevation. Fig. 3 is a section on the line 3 3, Fig. 1. Fig. 4 is a partial plan view on an enlarged scale. Fig. 5 is a section on the line 5 5, Fig. 4. Fig. 6 is a section on the line 6 6, Figs. 4 and 5. Fig. 7 is a section lengthwise of the recessed band on the line 7 7, Fig. 4. Fig. 8 is a section through the recessed band and its supporting-pulley at its delivery end. Fig. 9 is a section on the line 9 9, Fig. 8; Fig. 10, a plan view of the folding mechanism. Fig. 11 is a section of the same on the line 11 11, Fig. 10. Fig. 12 is a side elevation of the tobacco-feeding spout, the eccentrically-located grooved compressing-disk, and the supporting-plate, as seen from the right hand in Fig. 1. Fig. 13 is a section on the line 14 14, Fig. 1. Fig. 14 represents the paper-cutting knife and the mechanism for operating it. Fig. 15 is a section on the line 16 16, Fig. 5.

The general plan of operation of my improved cigarette-machine will be understood from an examination of the accompanying drawings and the following description. The tobacco properly prepared is received from any suitable feeding mechanism through the spout A, and is compressed into a suitable filler by the action of the revolving eccentric compressing-disk B, the revolving plate C, and the grooved belt D, and the filler thus formed is projected at $t''$, Fig. 1, toward the traveling recessed belt E. The filler $t$ is at the proper times cut into suitable lengths by the circular revolving cutter F, (which has a double movement toward the filler and also lengthwise with it,) and the cut fillers are then inserted in the recesses in the belt E at the same time with the wrappers, which are cut to the proper lengths, after which, by the movement of the recessed belt, the wrapped fillers are moved onward and the cigarettes completed by the closing of the wrappers about the fillers. The traveling recessed belt E is provided with transverse recesses $a$, of a width adapted to receive the cigarettes of the size which the machine is designed to make. The paper $b$ is fed into the machine by the mechanism represented in Fig. 5, being severed into suitable lengths by the knife $c$. The finished cigarettes are discharged at the left-hand end of the machine, as seen in Fig. 2, a suitable device being employed to distend the recesses $a$ by bending the belt E.

Proceeding now to a more detailed description of a machine embodying my present improvements, G is a suitable table supporting the operative parts of the machine, and which is itself sustained by any suitable legs or frame-work.

H, Fig. 1, is the main driving-pulley, from which movement is transmitted to the various working parts of the machine.

The tobacco is delivered into the spout A by any suitable tobacco-feeding mechanism, and falls by gravity through the said spout onto the revolving plate C, which closes the bottom of the spout. As the plate revolves in the direction represented by the arrow in Fig. 1, it carries the tobacco resting thereon out of the spout A, a portion of the vertical wall of which is cut away for this purpose, as represented at $t^5$, Fig. 12, and delivers it into the widest end of the tapering curved space $e$, Figs. 1 and 13, in which the compression of the tobacco into a continuous filler is accomplished. The spout A is maintained in an operative relation with the other parts by a standard $s^5$, attached to the table G.

As already remarked, the compression of the cut or fibered tobacco into a suitable tobacco-rod or continuous filler is effected between the revolving eccentrically-located disk B and the grooved belt D, the tobacco being supported while traveling through the tapering curved space $e$, Fig. 1, between the eccentrically-located disk and the grooved belt, by the circular plate C. The space $e$ is inclosed on the outer side by the groove in the belt D, on the inner side by the groove $m$ in the edge of the disk B, on the upper side by the stationary segment S, and on the bottom by the revolving plate C. The tobacco is carried onward by the friction of the belt, disk, and plate and compressed between them into the continuous cylindrical rod or filler $t$. The revolving plate C is supported in a hollow standard P, Fig. 3, arising from the table G, by a sleeve O, which standard is made of an internal diameter sufficient to revolve outside of the eccentrically-located shaft N, which supports the compressing-disk B. Motion is transmitted from the shaft I of the driving-pulley H by the pinion $d$, gear $f$, shaft $g$, bevel-gears $h$ $i$, shaft $j$, and pinion $k$, which meshes with the gear J on the lower end of the sleeve O, carrying the revolving plate C. The pinion $k$ also drives the eccentrically-located disk B by means of the gear K on the lower end of the shaft N, to which the disk is attached. As indicated in Fig. 3, the gear K is made smaller than the gear J. The shaft N is supported below the gears by the bracket M, attached to the table G, and above the disk by a boss Q, Fig. 1, attached to the arm or arms R, reaching over the disk and secured to the segment S, which confines the tobacco in the tapering curved space $e$ during the compressing operation, and which is itself supported by one or more brackets T. The flexible grooved belt D, which assists in the compression of the continuous tobacco-filler by closing the outer edge of the tapering curved space $e$, is supported by the pulleys U U', which revolve on suitable standards arising from the table. These pulleys are made of such dimensions and are so located as to cause the belt to bend around the revolving plate C and segment S for a sufficient distance. The groove $l$, Fig. 3, in the belt D is made of a semicircular or nearly semicircular form, adapted to form about one half of the continuous filler of the desired size. The edge of the compressing-disk B is also provided with a groove $m$, Fig. 3, adapted to form the other half of the continuous filler. The pulley U is made slightly crowning, as shown in the sectional view, Fig. 3, so as to distend the groove in the belt by bending it slightly in the transverse direction, so as to facilitate the discharge of the formed filler.

Any suitable tobacco-feeding mechanism may be employed in connection with my improved cigarette-machine, and any suitable tobacco-filler-forming mechanism other than that herein represented may be used as one of the operative parts of a cigarette-machine constructed in accordance with my present invention.

The shaft I is utilized to perform the various functions of severing the filler into suitable lengths, of feeding and cutting the paper wrapper, and of inserting the severed filler inclosed in the wrapper in the recesses in the endless flexible belt D in the following manner: F is a revolving sharp-edged disk driven at a high speed by the belt $n$ and carried on the arm V in such position that it is forced against the filler $t$ to sever the same (see full and dotted lines in Fig. 5) by a cam $o$, Fig. 4, on the shaft I. The arm V is arranged to swing on the shaft W, placed parallel to the shaft I and supported on suitable standards $p$, which also by arms $q$ sustain the shaft I. The cam $o$ on the shaft I is arranged so as to depress the arm V at the proper time to force the cutter F against the filler $t$, so as to sever it. The tobacco-filler $t$ is supported during the cutting operation by the tube X, carried by a suitable bracket. The belt $n$ runs at an angle with the vertical line or around suitable movable corner pulleys, or an elastic belt may be used. A suitable counter-shaft is arranged overhead to drive the belt $n$. The free end of the arm V is provided with a suitable socket or journal-box $s$, in which the shaft $u$ of the cutter F revolves, a pulley $w$ for the belt $n$ being placed on one end of the shaft. The belt $n$ runs around the pulley $w$ on the shaft $u$, which turns in the socket $s$ and supports the cutting-disk F. As the filler is moving lengthwise while the cutting operation is going on, it is desirable to make the cutter travel in the same direction with the filler and at approximately the same speed. This result is accomplished by arranging the arm V so that it can slide lengthwise on the supporting-shaft W and providing an inclined cam $v$, Fig. 4, on the shaft I, arranged to shift the arm V laterally, as indicated by the full and dotted lines, while the cutter is being depressed by the cam $o$ to sever the continuous filler, the tube Y, which supports the cut section of the filler, being also arranged to slide lengthwise. A spring $X^2$, Fig. 4, on the shaft W returns the arm to the position indicated by the full lines in Fig. 4, and the same or another spring is arranged to raise the outer end of the arm and the cutter after the filler has been severed, so as to permit another length of the filler to be fed under the cutter. The cam $o$ acts on the upper side of a lug or projection on the arm V to depress the cutting-disk F, and the inclined flange or cam $v$ acts on the side of the lug to shift the arm and the cutter laterally during the operation of severing the continuous filler into suitable lengths. Provision is thus made for both the vertical and lateral movement of the cutter during the operation of severing the filler and for the return of the cutter to its original position. The sliding tube Y is supported in a suitable guide Z, Figs. 5 and 6, attached to the bed A', which supports the recessed band E, or to any other suitable part of the machine. The cutter, when it descends to cut the filler, passes into a suitable opening between the stationary tube X and the sliding tube Y. In order to cause the sliding tube to shift laterally with the cutter F, it is provided with an arm $x$, (see Fig. 6,) which extends upward and passes into a slot or opening in the hub $s$. The tubes X and Y are placed in line with each other, and their ends which receive the filler may be more or less conical or flaring. The rod $x$ is firmly attached to the sliding tube Y, and as it extends upward into the hub $s$ it compels the tube to move endwise in its support at the same time and for the same distance as the arm V moves laterally, the outer end of sliding tube Y remaining always close to the side of the cutting-disk F. As the hub $s$ moves downward toward the tube Y it slides on the rod $x$; but when it moves laterally it causes the tube to move with it. The upper part of the guide Z is slotted or cut away to permit the movement of the tube X. The cut section of filler, of a length equal to that of the cigarette which the machine is designed to make, is pushed forward by the uncut section underneath the plunger B' and above one of the recesses $a$ in the traveling recessed band E. The paper $b$ is fed in by suitable mechanism, hereinafter described, in the position indicated at $e'$, Figs. 4 and 5, underneath the cut section $t'$ of the filler and above the recess in the band. As the paper is wider than the recesses in the band E, as indicated by the dotted lines $e'$ in Fig. 4, the paper, even if it sags a little in being fed in, will rest on the upper surface of the band between the recesses, and the cut section of the filler will rest on the paper even if its free end drops downward a little in being introduced under the plunger B', which descends immediately after the end of the section has been forced out of the sliding tube Y. If the plunger B' is delayed in its descent from the improper timing of the machine, the cut section will rest on the paper until inserted in the recessed band by the plunger. The paper is fed into the machine somewhat in advance of the cut section, so as to prevent the end of the paper from coming in contact with the end of the cut section. Both the paper and the cut section of filler $t'$ are inserted in the recess by the descent of the plunger, the edges of the paper being left projecting upward above the band, as indicated at $e^2$ $e^3$, Figs. 7 and 11. One edge of the paper is gummed before it enters the machine, and the edges are folded down on each other by the folders, hereinafter described, to inclose the cut section of filler $t'$ and to form the finished cigarette.

The band E is formed of any suitable flexible material, such as india-rubber, and it is provided in its outer surface with the angularly or transversely arranged cigarette-recesses $a$, which are made of a length corresponding with that of the cigarettes and semicircular in form, of a depth preferably a little more than half the diameter of the cigarettes. The recesses are arranged at equal distances apart the whole length of the band, which runs over the supporting-pulleys C' C², Fig. 2, arranged to revolve on shafts supported in suitable journals $d'$ on the frame G.

Provision is made for giving the recessed band an intermittent movement equal in length to the distance between the recesses in any suitable manner—such, for instance, as that shown in the accompanying drawings, in which the band is driven from a crank on the shaft I by the connection D', lever G', and ratchet-wheel and pawl H' I'. As the shaft I revolves continuously when the machine is in operation, it will be understood that the crank $f'$ on it will impart a reciprocating movement to the connection D' and lever G', and that this movement will be transmitted to the ratchet-wheel H' by the pawl I' in one direction only, thus giving the band E a step-by-step movement from right to left in Fig. 2, as indicated by the arrows. The ratchet-wheel H' is either secured directly to the pulley C', which carries the band E, or to the shaft on which this pulley is mounted.

Provision may be made in any suitable way for adjusting the journal-boxes $d'$ on the frame, so as to secure the requisite degree of tension on the band E. As indicated in the drawings, the band E is made somewhat wider than the length of the cigarettes. It is obvious, however, that it might be made of a width equal to their length, although I prefer the construction shown as giving a better finish to the ends of the cigarettes. The band is strengthened by one or more layers of cloth or other suitable fabric, as represented at $g'$, Figs. 7 and 11.

The arrangement of the band and its supporting-pulleys and driving mechanism should be such that the band stops with one of the recesses $a$ immediately under the plunger B'.

The mechanism for inserting the cut sections of filler $t'$ and the paper wrappers into the recesses in the band will be understood from an inspection of Fig. 7. An arm J', pivoted between suitable collars, so as to swing freely on the shaft W, is jointed at its outer end to the stem $h'$ of the plunger B'. The stem $h'$ of the plunger B' is jointed to the end of the arm J' by being pivoted on the screw $x^5$, inserted in the arm, as plainly shown in the sectional view, Fig. 5. A cam $y$ on the shaft I is arranged to act on the arm J', so as to force the plunger B' down when the band E is stationary, so as to force the cut filler and paper into the recess in the band. The lower surface of the plunger B' is provided with a longitudinal groove adapted to the shape of the cigarette. The upper surface of the plunger B', on the side where the filler is fed in, is cut away or beveled, as indicated at $i'$, Fig. 5, so that, as the feeding of the filler is continuous, the end of the next section of filler may be projected slightly over the plunger, which is held down by the cam $y$ until the band has commenced to move. The motion of the band swings the plunger on its pivot on the end of the arm J', as represented by the dotted lines $B^2$ in Fig. 7, so that as the plunger moves with the band while being held down in contact with the tobacco in the recess the beveled end $i'$ of the plunger passes under the end of the incoming filler, and as the arm J' rises, under the influence of a suitable spring, the cam $y$ having traveled beyond the lug $y^5$ on the arm, the plunger moves upward alongside of the filler and assumes its position above the filler, being swung back against the stop $k'$ on the arm by the spring $l'$. The plunger is then in position to repeat the operation of inserting the cut filler and the wrapper into a recess in the band, when it again becomes stationary. Suitable guides may be used to secure the proper movement of the plunger, if desired.

The paper-feeding devices will be best understood from an examination of Fig. 5, in which K' is the paper-supply roll, L L' guide-rollers, and M' N' the feeding-rollers. O' is a paste-wheel which applies the paste or gum to the edge of the paper, the paste being supplied to the wheel from any suitable receptacle or in any suitable manner. The paste-wheel and the mechanism for supplying paste thereto are of any ordinary construction, such as is commonly used in machines for making cigarettes.

The roller N' is operated from a cam $x'$, Fig. 4, on the shaft I, so as to feed the paper in an intermittent manner in the following way: The shaft $o'$ of the roller N' is arranged to rotate in a suitable support and is provided with a ratchet-wheel $r'$, which is operated by the lever $s'$, pawl $u'$, connecting-rod $v'$, and arm $w'$ from a cam $x'$ on the shaft I. The arm $w'$ is arranged to swing freely on the shaft W, and the connecting-rod $v'$ is provided with ball or universal joints at its ends, by which it is connected to the free ends of the arm and the lever, so that when the arm is raised by the cam the pawl $u'$ turns the ratchet-wheel $r'$ through a certain portion of a revolution, turning the roller N' and feeding the paper across the band and underneath the cut filler and plunger. The paper is cut into suitable lengths by the knife $c$, Figs. 4 and 5, which is operated by the descent of the plunger, which is provided with a projecting pin $y'$, arranged to bear on the upper side of the knife. The paper rests while being cut upon a suitable support $z'$, Figs. 5 and 15. The knife is pivoted at $a^2$, Figs. 5 and 15, to a suitable support secured to the bed A'. A spring may be employed to raise the knife after the paper has been cut, or it may be raised by the plunger. It is needless to remark that the cam $x'$ on the shaft I should be so timed that the paper is fed into the machine while the plunger is elevated. The knife $c$ is pivoted at $a^2$ to an arm $z^5$, Fig. 14, attached to the plate A' and extending over the edge of the recessed band E. A spring $a^5$, Fig. 14, attached to the arm $z^5$ and bearing against the pin $b^5$ in the knife, serves to hold the knife in the elevated position represented by the full lines, except when it is depressed for the purpose of cutting the paper by the pin $y'$ in the plunger. A stop $c^5$, Fig. 14, inserted in the knife, serves to limit the upward movement by striking against the side of the arm $z^5$.

The construction of the folding mechanism is represented in Figs. 1, 10, and 11. Over the band and parallel to the recesses $a$ I provide a guideway, on which the frame R' slides. This frame carries a folder S', which as the band moves along under it operates to fold down the front edge $e^3$, Fig. 11, of the paper and to hold it down until the other edge (gummed) is folded down over it by the action of the revolving brush T', which is shifted laterally across the band to effect this result. The frame R' carries two folders S' $S^2$, and after one cigarette has been folded the frame remains stationary until the band has brought the next cigarette under one or the other of the folders, which are thus used alternately, while the brush is used on each cigarette. The guideway on which the frame R' travels consists in the arrangement shown in the drawings of the two parallel rods V' $V^2$, supported at their ends by any suitable standards, such as are shown in Figs. 1 and 2. The frame R' has an intermittent reciprocating movement on the rods V' $V^2$ imparted to it by the cam-groove $g^2$ on the wheel X', lever Y', and connecting-rod Z', or in any other suitable manner. The motion of the frame is sufficient to shift the brush from one side to the other of the band, as from T' to $T^2$, Fig. 10, and to bring the folder $S^2$ into the position over the band occupied by the folder S', or vice versa. The wheel X' is supported in any suitable frame-work $b^2$, Fig. 1, to which also the lever Y' is pivoted at $c^2$. The wheel X' is driven from the shaft I by the gears $d^2$ $f^2$ at one-half the speed of the shaft. The wheel X' is provided with a cam-groove $g^2$, in which a roller on the end of the lever Y' travels, the arrangement being such that the frame R' travels across the band E in one direction or the other and folds the paper wrapper every time the band stops and remains stationary, first on one side of the band and then on the other, while the band is moving. The brush T' is carried by a shaft $h^2$, arranged to revolve in suitable bearings on the frame and driven by a belt $i^2$, Fig. 10, running around a pulley on the shaft and on a long pulley mounted on an overhead counter-shaft.

$j^2$ is a projecting lug attached to the frame R′ below the pulley $i^2$, on which the connecting-rod Z′ is pivoted. As indicated in Fig. 2, the connecting-rod D′, by which the band E is operated, is bent so as to pass over the frame R′; but the brush does not move far enough to come in contact with the connecting-rod. The brush may be made of bristles or of any other suitable material adapted to fold down the paper without injuring it. It will be observed that the paste or gum is applied to the paper on the edge which afterward becomes the inner side of the projecting flap $e^2$, Fig. 11, so that the brush does not come in contact with the gummed surface. The folders S′ S² are preferably made of some slightly elastic or flexible material, such as rubber. As represented in Fig. 11, they are attached to the frame so that they can be adjusted relatively to the cigarette by means of the block $k^2$ and the screws $l^2$ or $m^2$, or in any other suitable manner. Instead of using the two folders S′ S², a single folder might be used, the frame R′ being moved across the band and back again during each of the pauses in the motion of the band E.

In order to provide for opening the recesses in the band to secure the free discharge of the cigarettes, I provide the pulley C′ at the delivery end of the band with a series of transverse ribs or ridges $n^2$, arranged at distances apart corresponding with the space between the recesses, so that as the band passes around the pulley the recesses are spread or opened, so as to allow the finished cigarettes to drop freely out of the recesses, as at $t^4$, Fig. 8, into some suitable receptacle. The ridges $n^2$ may be made shorter than the length of the cigarette-recesses, so that the edges of the belt may be bent inward slightly by the strain, as indicated by the dotted lines in Fig. 9, so as to free the ends of the cigarettes, or the pulley may be made narrower than the width of the band, with the ridges extending all the way across it. The ribs may be integral with the pulley or attached thereto in any suitable manner.

In order to remove the filler from the groove in the compressing-disk B, a scraper $p′$, Fig. 1, is attached to the segment S, being made of a suitable form adapted to enter the groove and secure the disengagement of the tobacco therefrom.

I do not claim herein the construction of the filler-forming mechanism covered by my application, Serial No. 315,897.

I claim—

1. The combination, with the endless traveling band E, provided on its outer surface with transverse cigarette-recesses, of the reciprocating carriage R′, arranged to reciprocate transversely across the length of the band and carrying mechanism adapted to fold and seal the wrapper about the cigarettes in the recesses, substantially as described.

2. The combination, with the endless traveling band E, provided on its outer surface with transverse cigarette-recesses, of the reciprocating carriage R′, arranged to reciprocate transversely across the length of the band and carrying the folder S′, substantially as described.

3. The combination, with the endless traveling band E, provided on its outer surface with transverse cigarette-recesses, of the reciprocating carriage R′, arranged to reciprocate transversely across the length of the band and carrying the revolving folding-brush T′, substantially as described.

4. The combination, with the endless traveling band E, provided on its outer surface with transverse cigarette-recesses, of the reciprocating carriage R′, arranged to reciprocate transversely across the length of the band and carrying the revolving folding-brush T′ and the folder S′, substantially as described.

5. The combination, with the endless traveling band E, provided on its outer surface with transverse recesses, of the reciprocating carriage R′, arranged to reciprocate transversely across the length of the band and carrying the revolving folding-brush T′ and the folders S′ S², arranged on opposite sides of the brush, substantially as described.

6. The combination, with the endless traveling band E, provided on its outer surface with transverse cigarette-recesses, and mechanism constructed to impart an intermittent movement to the band, of the reciprocating carriage R′, arranged to reciprocate transversely across the length of the band and provided with devices for folding and sealing the paper wrapper about the cigarette in the recesses, and mechanism for traversing the carriage across the band between each intermittent movement thereof, substantially as described.

7. The combination, with a suitable tobacco-filler-forming mechanism adapted to form a continuous cigarette-filler, of the endless traveling band E, provided on its outer surface with transverse cigarette-recesses, a suitable filler-cutter, paper feeding and cutting mechanism, a reciprocating plunger for inserting the cut filler-sections and paper wrappers in the recesses in the band, and means for finishing the cigarettes, substantially as described.

8. The combination, with a suitable tobacco-filler-forming mechanism adapted to form a continuous cigarette-filler, of the endless traveling band E, provided on its outer surface with transverse cigarette-recesses, a suitable filler-cutter, paper feeding and cutting mechanism, a reciprocating plunger for inserting the cut filler-sections and paper wrappers in the recesses in the band, and suitable apparatus for folding and sealing the wrappers about the cigarettes while contained in the recesses, substantially as described.

9. The combination, with a suitable continuous tobacco-filler-forming mechanism, of the oscillating laterally-movable rotary filler-cutter F, the stationary filler-guide tube X, the movable guide-tube, the intermittingly-moving endless flexible band E, provided with transverse cigarette-recesses, and a reciprocating plunger adapted to insert the cut sections of the filler into the recesses in the band, substantially as described.

10. The combination, with a suitable continuous tobacco-filler-forming mechanism, of the oscillating laterally-movable rotary filler-cutter F, the filler-guide tube X, the intermittingly-moving endless flexible band E, provided with transverse cigarette-recesses, a reciprocating plunger adapted to insert the cut sections of the filler and a suitable wrapper into the recesses in the band, and suitable apparatus for folding and sealing the wrapper about the cut sections of the filler while contained in the recesses in the band, substantially as described.

11. The combination, with the intermittingly-moving endless flexible band E, provided with the transverse cigarette-recesses $a$, of the band-carrying pulley C', provided with transverse ribs $n^2$, adapted to distend the recesses by pressure on the inner surface of the band, substantially as described.

OSCAR W. ALLISON.

Witnesses:
GEO. B. SELDEN,
C. G. CRANNELL.